United States Patent Office 3,432,548
Patented Mar. 11, 1969

3,432,548
PROCESS FOR PRODUCING α,α, DIMETHYL-β-HALOPROPIONIC ACIDS
Roe Calvin Blume, Wilmington, Del., assignor to E. I. du Pont de Nemours and Company, Wilmington, Del., a corporation of Delaware
No Drawing. Filed Sept. 22, 1965, Ser. No. 489,404
U.S. Cl. 260—539                                  3 Claims
Int. Cl. C07c 53/32; C08g 53/22

ABSTRACT OF THE DISCLOSURE

α,α-Dimethyl-β-halopropionic acids are recovered from polyesters consisting of the recurring structural unit

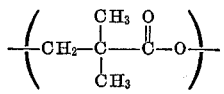

by hydrolysis with hydrochloric or hydrobromic acids.

---

The present invention provides a novel process for the recovery of α,α-dimethyl-β-halopropionic acids from polypivalolactone. It also provides novel processes for the recovery of α,α-dimethyl-β-halopropionic acids from polyester wastes and by-products obtained in the preparation and fabrication of such polymers in which the sole or principal β-lactone component is α,α-dimethyl-β-propiolactone. These and other provisions will become apparent from the specification and claims which follow.

Despite continuing efforts to achieve maximum efficiency in the utilization of materials in the producton of polymers or of shaped articles prepared therefrom, commercial practices result in the unavoidable collection of waste material or of material which must be reworked into other shapes in order to produce the useful products. Such wastes and materials include low polymers, contaminated monomers and polymers, trimmings, waste fibers and yarns, damaged moldings and castings, and the like. When a miscellaneous collection of such materials is to be recovered, it is often not practical or economical to effect recovery but melting, grinding, or compacting the materials themselves. Instead, it is usually preferable to recover the more expensive of the polymer-forming ingredients in the form of functional derivatives which can be reconverted into useful polymer.

Illustrative of the latter recovery practice are the processes for recovering dimethyl terephthalate in polymerizable form from polyethylene terephthalate scrap material which are described in U.S. Patents 3,098,046; 3,037,050; 3,008,980; and 2,884,443.

The processes of this invention are of particular value for recovering α,α-dimethyl-β-bromopropionic acids and α,α-dimethyl-β-chloropropionic acid from polyesters comprised in whole or in principal part of poly(α,α-dimethyl-β-propiolactone) units. The polyesters and polymeric shaped articles prepared therefrom, such as fibers, yarns, and films, to which the novel recovery processes of this invention may be applied, are polymers consisting essentially of the following recurring structural unit

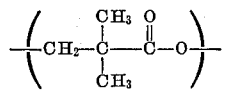

They are described in U.S. Patent 2,658,055, Fr. Patent 1,231,163 and in other prior art. Polyesters corresponding to the above-cited structural unit are those prepared by polymerizing, for example, α,α-dimethyl-β-propiolactone. Fibers of these polymers in the 1–3 denier per filament range having high orientation and crystallinity have been successfully employed in this process.

According to the present invention, α,α-dimethyl-β-halopropionic acids are recovered by hydrolyzing polyesters of the type herein specified with an appropriate strong mineral acid, selected from the class of hydrochloric and hydrobromic acids, under specified conditions and recovering the β-halo acid thus formed.

The strong mineral acid may be used in a form in which it is usually available commercially, or it may contain added water, provided that so much water is not added that the acid becomes too dilute to effect the hydrolysis according to the present invention. Aqueous solutions of hydrobromic acid containing in excess of about 30% (by weight) active ingredients are advantageously employed in the process of this invention. Excellent results have been obtained with the commercially available constant boiling hydrobromic acid which has a specific gravity of 1.5 and contains about 48% by weight active ingredient. Useful concentrations of hydrochloric acid, employed as subsequently described herein, preferably contain no less than about 30% active ingredient (weight basis), with a preferred concentration being that of the commercial reagent containing 36.5%–38% hydrochloric acid. The proportion of mineral acid per portion of scrap material is not critical. The reaction consumes a mol of acid for each ester unit in the polymer, but usually a large excess of acid is employed in order to provide a fluid mass during the hydrolysis. The duration of the hydrolysis reaction is normally determined by the amount of scrap material used. For example, in a batch hydrolysis of about 40 lbs. of suitable scrap material, a reaction time of about 40 hours is generally employed in order to insure a high degree of hydrolysis, although a shorter period, e.g., 24 hours, is usually sufficient. While batch hydrolysis techniques are normally preferred, the processes of this invention may be run continuously in those instances wherein a steady supply of hydrolyzable scrap economically favors continuous operation.

When solutions of hydrobromic acid are used for the hydrolysis, the hydrolysis may be effected in any convenient manner. Usually it is performed at an elevated temperature at atmospheric pressure, conveniently at the boiling point of the hydrobromic acid solution being used. The hydrolysis may be performed under autogenous pressure, however, if desired. A useful temperature range for these reactions is 110–250° C. On the other hand, when solutions of hydrochloric acid are used in this invention, it is preferable to run the reaction under pressure in order to obtain a high yield of the β-halopropionic acid. With the hydrochloric acid solutions used in this invention, it is usually desirable to operate under autogenous pressure within a temperature range of about 110° C. to about 250° C. Since equipment hazards and corrosion damage increase rapidly at higher temperatures, it is not usually desirable to operate the process at temperatures higher than previously indicated; favorable rates of hydrolysis are obtained under the conditions described above.

The hydrolysis processes of this invention are indeed unusual in the light of the disclosures in "Industrie des Plastiques Modernes," vol. 14, 16–17 (1962), March, and in other references wherein it is indicated that polymers derived from substituted β-lactones are not modified by the action of concentrated hydrobromic acid solutions at reflux, even under conditions wherein a solution of 62% hydrobromic acid was employed for a period of 8 hours.

The following non-limiting examples are illustrative of the preferred embodiment of the present invention.

EXAMPLE I

This example demonstrates the pressurized hydrolysis of poly($\alpha,\alpha$-dimethyl-$\beta$-propiolactone) with hydrochloric acid to obtain chloropivalic acid.

A silver-lined autoclave of 900 ml. capacity is charged with 100 g. of poly($\alpha,\alpha$-dimethyl-$\beta$-propiolactone), which has an inherent viscosity of 1.82 measured at 30° C. as a 0.5% solution in trifluoroacetic acid, and 200 ml. of commercial concentrated hydrochloric acid containing 36.5–38% active ingredients. The autoclave is sealed and the contents heated at 175° C. at autogenous pressure for a period of 8 hours. After the reaction vessel is cooled, the contents, a mixture of liquid and crystals, are discharged and extracted with methylene chloride. The methylene chloride solution is dried over magnesium sulfate, filtered, and evaporated to give chloropivalic acid, 114 g. (83.5% yield), M.P. 40°–42° C. The infrared spectrum of this material is identical with that of a reference sample of chloropivalic acid.

When a quantity of poly($\alpha,\alpha$-dimethyl-$\beta$-propiolactone) fiber, having an inherent viscosity of 1.58 measured under the conditions previously described, is heated at total reflux for 24 hours in constant boiling hydrochloric acid (containing 20.3% active ingredient), the fiber becomes weakened and its inherent viscosity drops to 0.24, but no chloropivalic acid is isolated from the reaction.

EXAMPLE II

This example demonstrates the hydrolysis of fibers of poly($\alpha,\alpha$-dimethyl-$\beta$-propiolactone) with hydrobromic acid to produce bromopivalic acid.

A glass-lined still is charged with 40 pounds of poly-($\alpha,\alpha$-dimethyl-$\beta$-propiolactone) fiber ($\eta_{inh}$=1.58 at 30° C. as a 0.5% solution in trifluoroacetic acid) and 480 pounds of commercial 48% hydrobromic acid, after which the reaction mixture is distilled. The distillate is collected and cooled to 0° C., whereupon bromopivalic acid crystallizes and is isolated by filtration. The filtrate comprising hydrobromic acid is returned to the distillation apparatus. This charge produces 46.8 pounds of bromopivalic acid (dry weight basis) after the process is operated for approximately 40 hours. The bromopivalic acid is of quality suitable for cyclization to pivalolactone.

Alternatively, when the above-described hydrolysis is carried out for 24 hours at reflux a mixture of crude bromopivalic acid and powdery low molecular weight polymer is obtained after the reaction mixture is cooled to 0° C. The combined solids are washed with hexane to effect separation into a 13.6 pound quantity of the insoluble polymeric powder ($\eta_{inh}$=0.10) and 28 pounds of bromopivalic acid, M.P. 48.5° C.–50.0° C., recovered by evaporation of the hexane solution. The bromopivalic acid displays an infrared spectrum identical to that of a sample prepared by an independent synthesis from hydroxypivalic acid. The low polymer and the hydrobromic acid solution recovered may be recycled to effect further hydrolysis. A fiber sample removed after the initial hydrolysis has been carried out for 6 hours at reflux has an inherent viscosity of only 0.14; bromopivalic acid is already present on the condenser walls at this time. The following examples illustrate the desirability of employing polyesters in this process which conform to the previously described structure, i.e., those having two methyl radicals attached to the $\alpha$-position carbon atom.

EXAMPLE III

It is shown herein that a polyester prepared from $\alpha,\alpha$-diethyl-$\beta$-propiolactone resists conversion to $\alpha,\alpha$-diethyl-$\beta$-bromopropionic acid by the process of this invention.

A silver-lines tube is charged with 50 grams of powdered poly($\alpha,\alpha$-diethyl-$\beta$-propiolactone), having an inherent viscosity of 1.5 measured at 30° C. as a 0.5% solution in trifluoroacetic acid, and 100 ml. of aqueous hydrobromic acid containing 48% active ingredient. The tube is sealed and the contents heated at 200° C. at autogenous pressure for 8 hours. After the reaction vessel is cooled, the contents are discharged and the solid portion isolated by filtration. The recovered solids are washed with hexane to leave a degraded residue of the original polymer on the filter. The hexane filtrate is evaporated to yield about one gram of bromine-containing solid material. No $\alpha,\alpha$-diethyl-$\beta$-bromopropionic acid is recovered from this hydrolysis.

EXAMPLE IV

This example shows that poly($\alpha$-chloromethyl-$\alpha$-methyl-$\beta$-propiolactone) hereinafter referred to as poly(chloropivalolactone), resists conversion to $\beta,\beta'$-dichloropivalic acid or $\beta$-bromo-$\beta'$-chloropivalic acid by the process of this invention.

A. A silver-lined pressure bomb charged with 200 ml. hydrochloric acid (38%) and 100 g. of polychloropivalolactone (preparation described below as Example V) is heated at 175° C. for 8 hours with shaking. The bomb is cooled, the contents discharged and the solids isolated by filtration. The solid is essentially polychloropivalolactone. The filtrate is evaporated and the residue extracted with ethylene dichloride at the boil. The ethylene chloride solution is evaporated and only about .2 g. of the dichloropivalic acid is obtained after recrystallization from hexane.

B. A dispersion of 50 g. polychloropivalolactone in 200 ml. hydrobromic acid (48%) is stirred and boiled at the reflux temperature for 48 hours. The dispersion is then filtered and the solid is found to be unreacted polychloropivalolactone. The filtrate is evaporated to dryness but failed to provide any workable amounts of the expected $\beta$-bromo-$\beta'$-chloropivalic acid.

The following example illustrates the preparation of $\alpha$-chloromethyl-$\alpha$-methyl-$\beta$-propiolactone and subsequently, poly(chloropivalolactone). The preparation of 3,3'-dichloropivalic acid, referred to in the example, is described by Wilzbach, Mayo and Van Meter in J. Am. Chem. Soc., vol. 70, pages 4069 (1948).

EXAMPLE V

$\alpha$-Chloromethyl-$\alpha$-methyl-$\beta$-propiolactone

A 2-liter flask provided with a stopcock at the bottom is equipped with a stirrer, condenser, and thermometer. In the flask is placed a solution of 38.0 g. of sodium hydroxide in 500 ml. of water, followed by 100 ml. of a saturated sodium chloride solution. A solution of 171 g. of 3,3'-dichloropivalic acid in 600 ml. of ethylene chloride is then added. The mixture is stirred vigorously and is heated at 50° C. for 30 minutes, after which the layers are allowed to separate. The ethylene chloride lower layer is drained off. A second quantity of 600 ml. of ethylene chloride is added and the mixture is stirred and heated at 50° C. for 30 minutes, followed by separation of the ethylene chloride lower layer; and the procedure is then repeated once more with an additional 600 ml. quantity of ethylene chloride. The ethylene chloride solutions are combined, dried, and flash distilled to remove the ethylene chloride. The residual liquid is distilled. The product is $\alpha$-chloromethyl-$\alpha$-methyl-$\beta$-propiolactone having a boiling point of 53–56° C. at 2.3 mm. of mercury and a refractive index of 24° C. of 1.4520–1.4535. The yield is 84 g. (62% of theory).

A solution of di(tetrabutylammonium) adipate in tetrahydrofuran (0.09 g./ml.) is prepared, and 0.05 ml. of the solution is placed in a flask followed by the addition of 15.0 g. of $\alpha$-chloromethyl-$\alpha$-methyl-$\beta$-propiolactone. The solution is swirled to mix the ingredients and then allowed to stand for 120 hours. At the conclusion of this period, the flask contains a solid plug, which is removed by breaking the flask. The plug is cut up and then ground in a mill while being cooled with pieces of solid carbon dioxide incorporated in the mass being ground. The polymer is then purified by extracting it with refluxng tetrahydrofuran, after which the polymer is dried under vacuum. The yield of the product, poly(chloropivalolactone) is 14.3 g. (96% of theory). A sample of the polymer has a crystalline melting point of 246° C.

*Analytical data.*—Calculated for $(C_5H_7ClO_2)_x$ C, 44.6; H, 5.2; Cl, 26.2%. Found: C, 44.8, 44.7; H, 5.28, 5.19; Cl, 25.5, 25.6%.

What is claimed is:

1. A method for obtaining chloro- or bromopivalic acid comprising reacting a polyester consisting essentially of the following recurring structural units

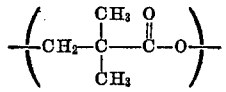

with an acid of the group of hydrochloric and hydrobromic of at least about 30% concentration at a temperature in the range of 110° to 250° C.

2. A method for obtaining chloropivalic acid comprising reacting under autogenous pressure, poly($\alpha,\alpha$-dimethyl-$\beta$-propiolactone) with hydrochloric acid of at least 30% concentration at a temperature in the range of 110° to 250° C.

3. A method for obtaining bromopivalic acid comprising reacting poly($\alpha,\alpha$-dimethyl-$\beta$-propiolactone) with hydrobromic acid of at least 30% concentration at a temperature in the range of 110° to 250° C.

References Cited

UNITED STATES PATENTS

| | | | |
|---|---|---|---|
| 2,449,163 | 9/1948 | Ford | 260—539 |
| 2,449,993 | 9/1948 | Gresham et al. | 260—539 |
| 2,658,055 | 11/1953 | Alderson | 260—78.3 |
| 2,839,576 | 6/1958 | Phillips et al. | 260—539 |
| 3,027,402 | 3/1962 | Pennino | 260—539 XR |

LORRAINE A. WEINBERGER, *Primary Examiner.*

A. P. HALLUIN, *Assistant Examiner.*

U.S. Cl. X.R.

260—343.9